United States Patent
Kim et al.

(10) Patent No.: US 6,677,654 B2
(45) Date of Patent: Jan. 13, 2004

(54) THERMOPILE DETECTOR AND METHOD FOR FABRICATING THE SAME

(75) Inventors: Insik Kim, Kyungki-do (KR); Taeyoon Kim, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/945,757

(22) Filed: Sep. 5, 2001

(65) Prior Publication Data

US 2002/0006683 A1 Jan. 17, 2002

Related U.S. Application Data (62) Division of application No. 09/247,504, filed on Feb. 10, 1999, now Pat. No. 6,305,840.

(30) Foreign Application Priority Data

Feb. 28, 1998 (KR) .............................. 98-6589

(51) Int. Cl.$^7$ ................... H01L 27/14; H01L 29/82; H01L 31/058
(52) U.S. Cl. ................... 257/414; 257/467
(58) Field of Search ................... 257/414, 467

(56) References Cited

U.S. PATENT DOCUMENTS

| | | | |
|---|---|---|---|
| 4,574,263 A | 3/1986 | Liddiard | 250/338.1 |
| 5,059,543 A | 10/1991 | Wise et al. | 438/54 |
| 5,369,280 A | 11/1994 | Liddiard | 374/121 |
| 5,374,123 A | 12/1994 | Bu | 374/109 |
| 5,689,087 A | 11/1997 | Jack | 136/225 |

FOREIGN PATENT DOCUMENTS

| | | | |
|---|---|---|---|
| JP | 0134529 | 6/1987 | 250/338.1 |
| KR | 2001038600 A | * 5/2001 | H01L/31/09 |
| SU | 289304 | 12/1970 | 252/62.3 T |
| SU | 0794399 | 1/1981 | 374/127 |
| WO | 8201066 | 4/1982 | 250/338.1 |

OTHER PUBLICATIONS

Walter Lang et al., "Absorbing Layers for Thermal Infrared Detectors in Solid State Sensors and Actuators", Digest of Technical Papers, Transducers '91; 1991 IEEE, pp. 635–638.

Dehe et al., "InGaAs/InP Thermoelectric Infrared Sensor Utilizing Surface Bulk Micromachining Technology", IEEE Transactions on Electron Devices, vol. 44 (7), Jul. 1997, pp. 1052–1058.

(List continued on next page.)

*Primary Examiner*—Mary Wilczewski
*Assistant Examiner*—Toniae M. Thomas
(74) *Attorney, Agent, or Firm*—Fleshner & Kim, LLP (57) ABSTRACT

Thermopile detector and method for fabricating the same, the method including the steps of (1) forming a diaphragm film on a substrate, (2) forming thermocouples in a given region on the diaphragm film, (3) forming a protection film on the thermocouples, (4) forming photoresist on the protection film and removing the photoresist from a given region, (5) forming a black body on an entire surface including the photoresist and removing remained photoresist and the black body on the photoresist, and (6) removing a portion of the substrate from a given region of a back-side of the substrate, to expose the diaphragm film, thereby facilitating a compatibility of fabrication process with an existing semiconductor fabrication process (a CMOS fabrication process), whereby improving a mass production capability, preventing a damage to the diaphragm film occurred in formation of the black body, and controlling a property of the black body uniform. And, the easy formation of the black body with a good bonding force allows to improve yield significantly, dropping a thermopile detector production cost.

13 Claims, 8 Drawing Sheets

OTHER PUBLICATIONS

Dehe et al., "Free-standing AlGaAs Thermopiles For Improved Infrared Sensor Design", IEEE Transactions On Electron Devices, vol. 43 (8), Aug. 1996, pp. 1193–1199.

Bergstrom et al., "Dielectric Membrane Technology For Conductivity and Work-Function Gas Sensors", Proc. of Transducers '95 Eurosensors IX, pp. 993–996, 1995.

Najafi, N., Wise, K.D., Schwank, J.W., "A Micromachined Ultra-Thin-Film Gas Detector," IEEE Transactions On Electron Devices, vol. 41 (10), Oct. 1994, pp. 1770–1777.

Majoo et al., "A Selected-Area CVD Method for Deposition of Sensing Films on Monolithically Integrated Gas Detectors", IEEE Electron Device Letters, vol. 16 (6), Jun. 1995, pp. 217–219.

* cited by examiner

THERMOPILE DETECTOR AND METHOD FOR FABRICATING THE SAME

This application is a Divisional of application Ser. No. 09/247,504 filed Feb. 10, 1999 now U.S. Pat. No. 6,305,840.

BACKGROUND OF THE INVENTION

1. Field of the Invention

The present invention relates to an infrared detector, and more particularly, to a thermopile detector and a method for fabricating the same.

2. Background of the Related Art

In general, a temperature measurement is closely related to our every day life, such as air conditioning and cooking. Of course, the necessity in the people's livelihood and industries is not be mentioned. Meanwhile, there are the contact type and the non-contact type in the temperature measurement. Most of the temperature measurement is in general the contact type, and the non-contact type is employed as a complementary means for a case when a contact is not practicable. For example, the non-contact type is used only limited to cases of measurement of objects that rotates, moving, and an object at a very high temperature not allowing a contact. The contact type is used widely more than the non-contact type because the non-contact type is expensive and difficult to handle. However, recently the demand on the non-contact type is increasing, particularly, demands on radiation pyrometers are increasing, which are simple and cost low for measurement in a comparatively low temperature range of 0~300° C. Since the circuit is simple and the infrared (IR) detector used in the radiation pyrometer becomes available at a cost lower than before, the radiation pyrometer becomes more economical than the contact type at times. In detectors sensing a radiation energy, there are photon detectors utilizing a photovoltaic effect or a photoconductive effect, and thermal detectors, such as bolometer, pyroelectric detector, and thermopile detector. The photon detector, utilizing an electric characteristic change of a detector when an incident radiation excites electrons therein, has an excellent sensitivity and a fast responsivity within a generally selected wave range. However, the photon detector has disadvantages in that related process technologies are not fully established yet, costs high, and should be operative at a temperature below a liquid-$N_2$ temperature for obtaining a required infrared ray sensitivity. Therefore, in order to use the infrared detectors for commercial and industrial purposes, a detector is required, that requires no cooling, costs low, and is reliable. Recently, there have been active researches for thermal detectors which can satisfy those features. As a result of such researches, detectors are developed, which provide useful information on substances that can not be known from a visible image, to find their usage in such fields as production examination, process monitoring, non-contact and non-destructive testing and the like. (Hg,Cd)Te, the most prominent material of those detectors up to now, has problems in that a process technology for mass production of the same is not fully matured yet and a cost and a uniformity of a substrate are not satisfactory yet. Accordingly, there have been active studies for thermopile detectors which satisfies the above problems while producible in an established semiconductor fabrication process. The thermopile detector is a detector utilizing a Seebeck effect in which, when two different materials are brought into contact at one ends to make a junction while the other ends are left open, there is a thermoelectric power generated in proportion to a temperature difference between the junction and the open end.

Figure 1A:
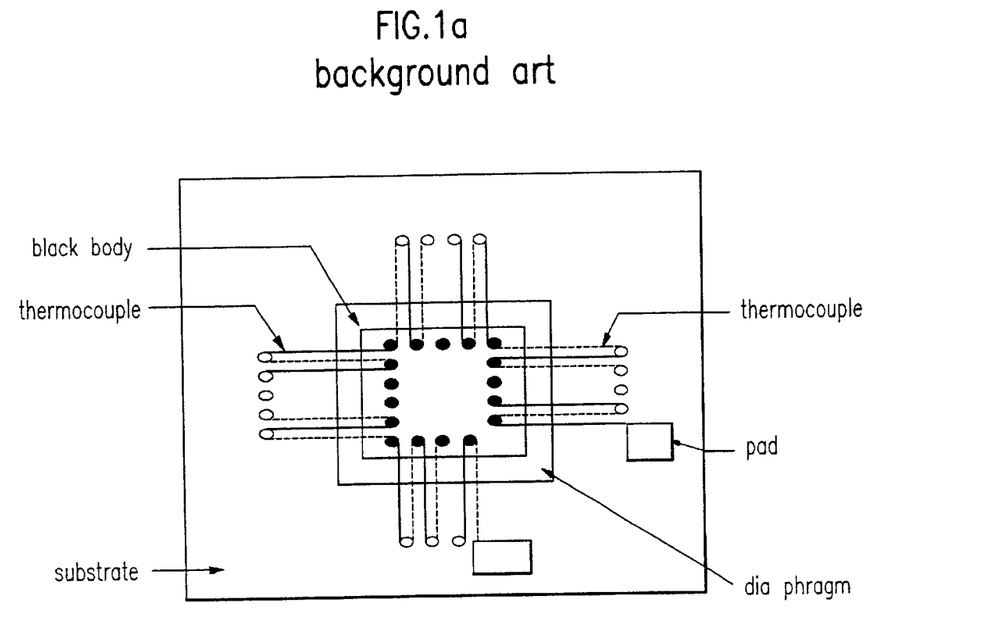
FIGS. 1*a* and 1*b* illustrate a plan view and a section each showing a related art thermopile detector.
Figure 1B:
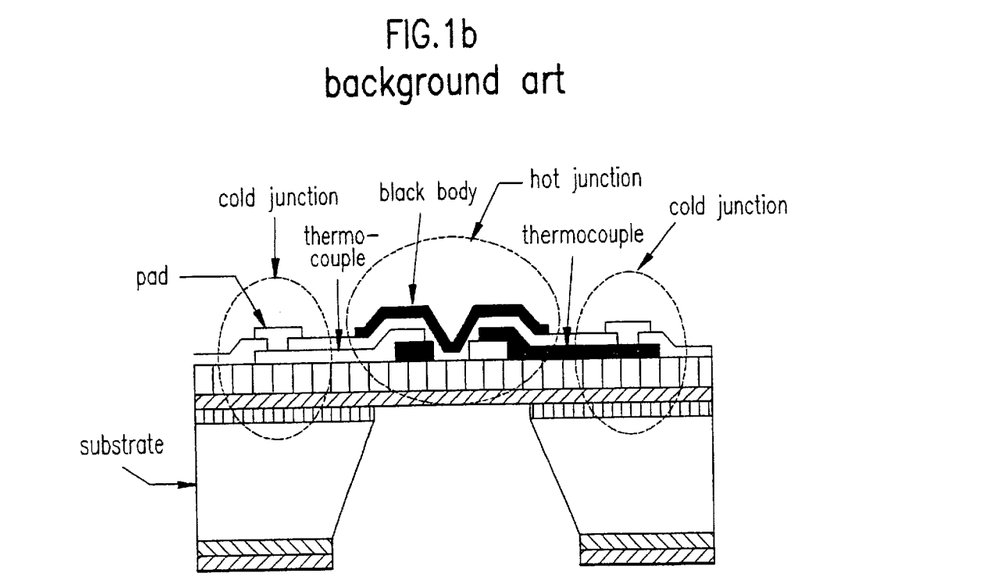

FIGS. 1a and 1b illustrate a plan view and a section view showing a related art thermopile detector.

Referring to FIGS. 1a and 1b, the related art thermopile detector is provided with thermocouples connected in series, with each of the thermocouples composed of elements of different materials with high thermoelectric powers with polarities opposite to each other. The thermocouples are arranged in a hot region and a cold region alternately, with hot junctions and cold junctions thereof thermally isolated from each other. In general, the cold junction is placed on a silicon substrate for being an effective heat sink, and a black body is formed at hot junction for absorption of an incident infrared. That is, the thermopile detector has two different thermoelectric materials connected in series on a thin diaphragm having a low thermal conductance and a low thermal capacitance. Such a thermopile detector has advantages in that the thermopile detector shows a stable response to a DC radiation, is responsive to a wide infrared spectrum, and requires no bias voltage or a bias current.

FIGS. 2a~2f illustrate sections showing the steps of a related art method for fabricating a thermopile detector.

Figure 2A:
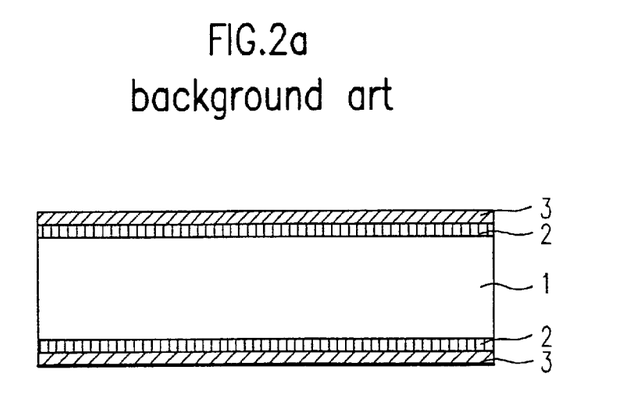
FIGS. 2*a*~2*f* illustrate sections showing the steps of a related art method for fabricating a thermopile detector
Figure 2B:
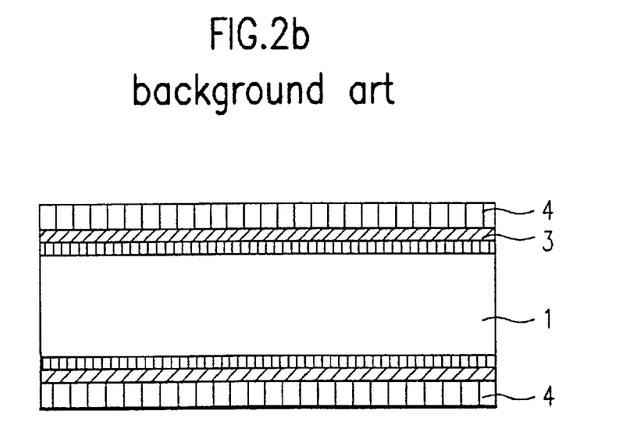
Figure 2C:
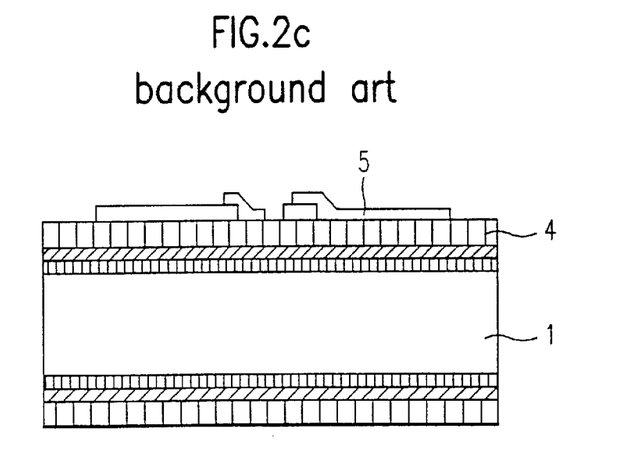
Figure 2D:
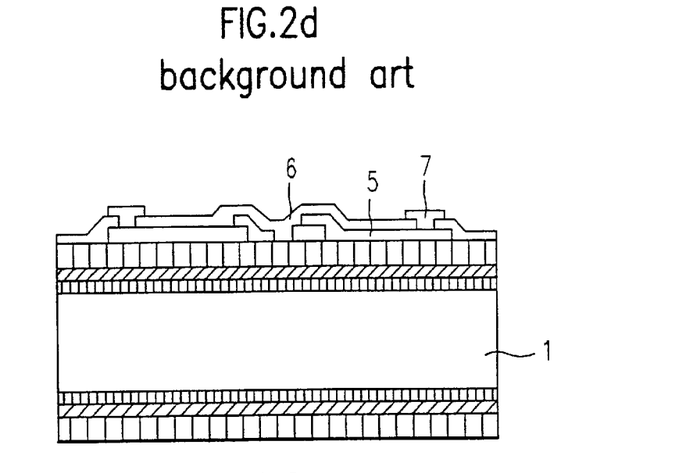
Figure 2E:
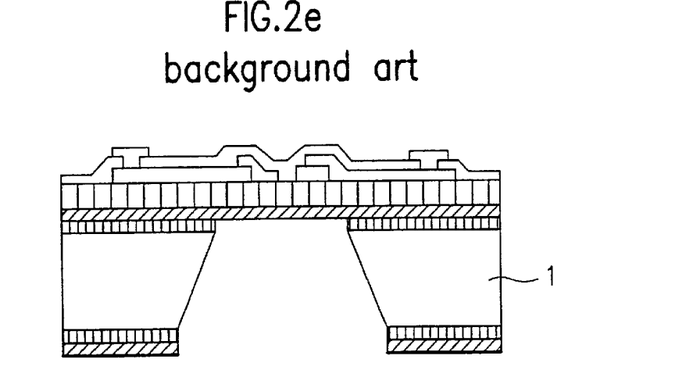
Figure 2F:
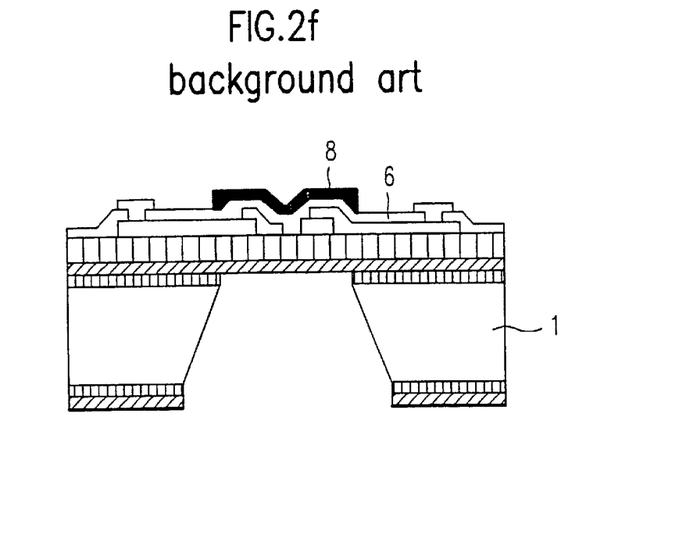

Referring to FIG. 2a, a silicon substrate 1 with a crystal orientation in (100) is provided, for back-side etching of the substrate 1 in a following process. Both surfaces of the substrate 1 are subjected to thermal oxidation to form a first oxide film 2 to approx. 2000 Å, and subjected to LPCVD to deposit a nitride film 3 to 3000 Å. The nitride film 3 is used as an etch mask in etching the substrate 1, and as an etch stop layer for stopping an etching. Then, as shown in FIG. 2b, an LPCVD is conducted to deposit a second oxide film 4 on the nitride film 3 to a thickness of approx. 7000 Å. Thus, an ONO (oxide/nitride/oxide) structure is formed, for mutual compensation of residual stresses of the films on completion of formation of the diaphragm, which allows to obtain a diaphragm film that is mechanically stable. That is, compressive stresses in the oxide films and tensile stresses in the LPCVD nitride film compensate each other. As shown in FIG. 2c, after formation of a diaphragm film thus, a first, and a second thermocouple materials 5 are deposited in succession on the second oxide film 4 on an upper surface of the substrate 1. The thermocouple materials 5 preferably have a greater Seebeck Coefficient to each other for a better sensitivity. And, as shown in FIG. 2d, a protection film 6 is formed on an entire surface including the thermocouple materials 5 for protection of the detector element from an outside environment, and a pad 7 is formed to be in contact with the thermocouple materials, for connection of an output from the detector to an external circuit. Then, as shown in FIG. 2e, a back-side of the silicon substrate 1 is etched to expose the diaphragm film. In this instance, a potassium hydroxide water solution (KOH) is used as an etching solution. And, the etching of the substrate 1 proceeds in a direction with a slope at an angle of 54.74° from a bottom surface of the substrate 1 as silicon is almost not etched in (111) orientation of a crystal orientation. The silicon nitride film 3 is used not only as an etch mask because the silicon nitride film 3 is almost not etched in a potassium hydroxide water solution, but also as an etch stop layer for solving a problem of an uneven etch surface caused by a non-uniform etch of substrate surface at finish of the etching. Then, as shown in FIG. 2f, a black body 8 is formed on the protection film. The black body 8 may be aluminum black, gold black, carbon black, and the like, which are very poor bonding force and sensitive to chemicals. Therefore, a black body can not be formed of those materials by a current CMOS process. Eventually, in the related art thermopile detector fabrication process, a black body forming step should be placed at an end of steps after all the steps for fabricating a CMOS are finished. If the black body is formed after formation of the diaphragm, because the diaphragm has a thickness approx. 1 μm, which is liable to damage during the process of black body formation, a great care should be taken. As the materials of the black body has a poor bonding force and sensitive to chemicals, there is a limitation in forming the black body by a CMOS fabrication process.

SUMMARY OF THE INVENTION

Accordingly, the present invention is directed to a thermopile detector and a method for fabricating the same that substantially obviates one or more of the problems due to limitations and disadvantages of the related art.

An object of the present invention is to provide a thermopile detector and a method for fabricating the same, which is compatible with a current semiconductor fabrication process.

Other object of the present invention is to provide a thermopile detector and a method for fabricating the same, which allows to form a stable black body.

Another object of the present invention is to provide a thermopile detector and a method for fabricating the same, which can prevent a damage to the thin diaphragm.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for fabricating a thermopile detector includes the steps of sputtering a black body formed of one selected from Ru, Ir, RuOx, and IrOx, forming a black body pattern by lifting-off, and forming a diaphragm by etching a back-side of a substrate.

In other aspect of the present invention, there is provided a thermopile detector including a substrate, a diaphragm formed on the substrate, thermocouples formed on a given region on the diaphragm for sensing a temperature, and a black body formed on the thermocouples, of one selected from Ru, Ir, RuOx, and IrOx.

In another aspect of the present invention, there is provided a method for fabricating a thermopile detector, including the steps of (1) forming a diaphragm film on a substrate, (2) forming thermocouples in a given region on the diaphragm film, (3) forming a black body on the thermocouples, and (4) removing a portion of the substrate from a given region of a back-side of the substrate, to expose the diaphragm film.

In further aspect of the present invention, there is provided a method for fabricating a thermopile detector including the steps of (1) forming a diaphragm film on a substrate, (2) forming thermocouples in a given region on the diaphragm film, (3) forming a protection film on the thermocouples, (4) forming photoresist on the protection film and removing the photoresist from a given region, (5) forming a black body on an entire surface including the photoresist and removing remained photoresist and the black body on the photoresist, and (6) removing a portion of the substrate from a given region of a back-side of the substrate, to expose the diaphragm film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

In an inventive concept of the present invention, a black body is formed of one selected from Ru, Ir, RuOx, IrOx by sputtering and lift-off, before formation of a diaphragm by etching a back-side of a substrate, to form a black body film of which process is interchangeable with a semiconductor fabrication process (a CMOS fabrication process), and which prevents a damage to the diaphragm, keeps a property of the black body uniform, and has an excellent bonding force.

FIGS. 3*a*~3*h* illustrate sections showing the steps of a method for fabricating a thermopile detector in accordance with a preferred embodiment of the present invention, wherein the steps in FIGS. 3*a*~3*d* are identical to the steps in FIGS. 2*a*~2*d* in the related art, of which explanations will be omitted.

Figure 3A:
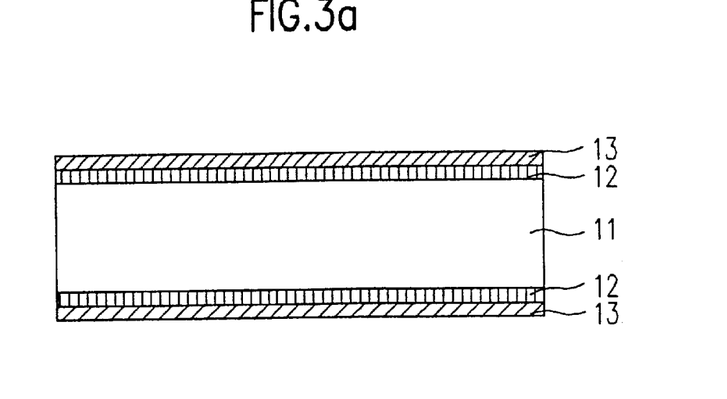
FIGS. 3*a*~3*h* illustrate sections showing the steps of a method for fabricating a thermopile detector in accordance with a preferred embodiment of the present invention.
Figure 3B:
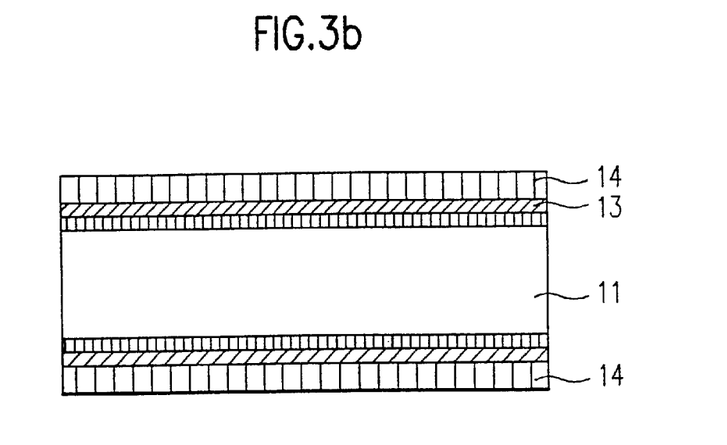
Figure 3C:
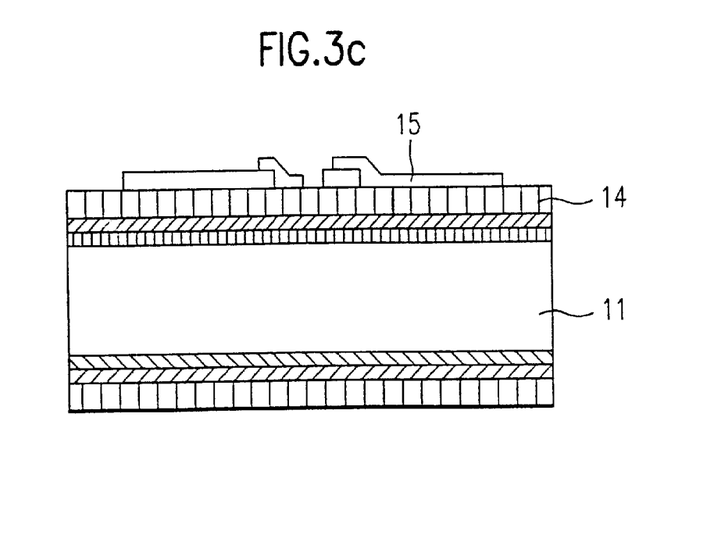
Figure 3D:
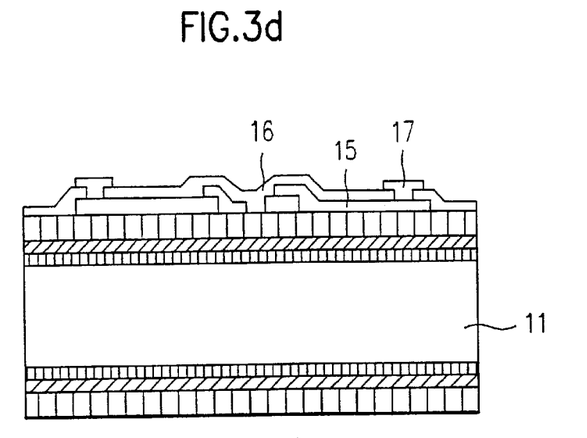
Figure 3E:
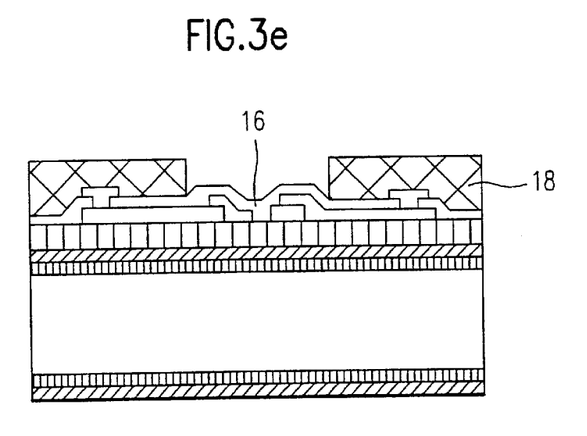
Figure 3F:
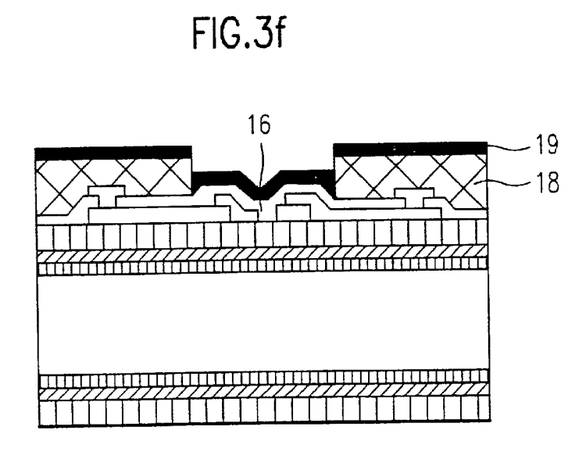

Referring to FIG. 3*e*, photoresist 18 is coated on an entire surface including the protection film 16, and a portion of the photoresist 18 in a region the black body is to be formed is removed by a photoresist developing process. And, as shown in FIG. 3*f*, the black body 19 is sputtered on an entire surface including the remained photoresist 18 to a thickness of approx. 500~600 Å. In the sputtering, a metal, such as Ru (Ruthenium) or Ir (Iridium), or an oxide, such as RuOx (Ruthenium Oxide) or IrOx (Iridium Oxide) is used as a target material for forming the black body. In this instance, since a black body formed only of Ru or Ir has a great reflexion ratio, oxygen should be fed together with argon, which is a process gas in the sputtering. An injection ratio of oxygen to argon should preferably be 50~70%, i.e., $O_2/Ar$= 0.5~0.7. In the present invention, Ru or Ir is used as a target for deposition of the black body, and oxygen is injected during the deposition, to form a black body of RuOx or IrOx.

Figure 3G:
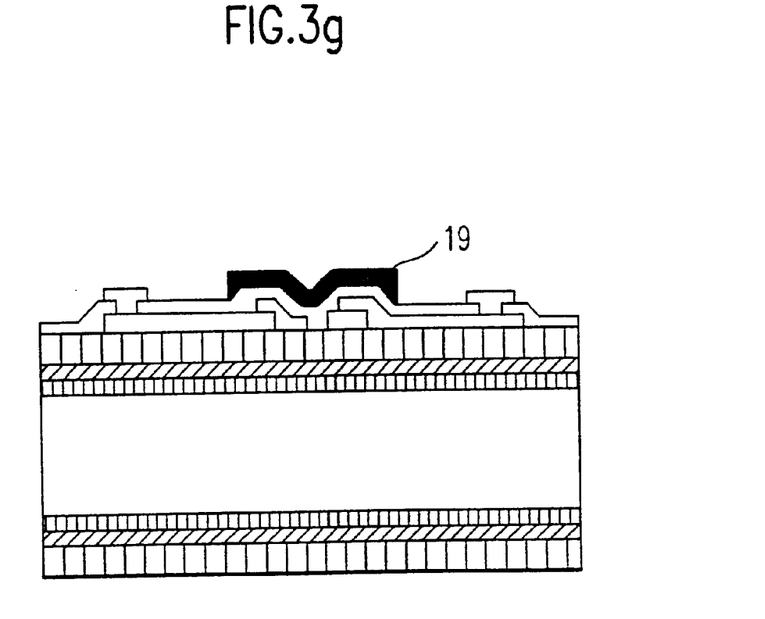
Figure 3H:
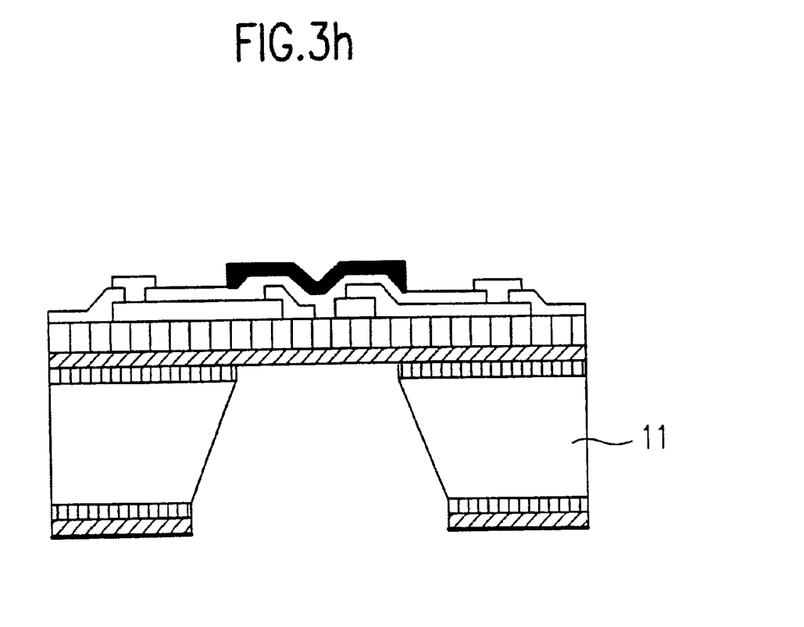

Then, as shown in FIG. 3g, the remained photoresist 18 and the black body 19 on the photoresist 18 are removed by lift-off. And, as shown in FIG. 3h, a back-side of the silicon substrate 11 is etched to expose the diaphragm film, thereby completing fabrication of a thermopile.

Figure 4:
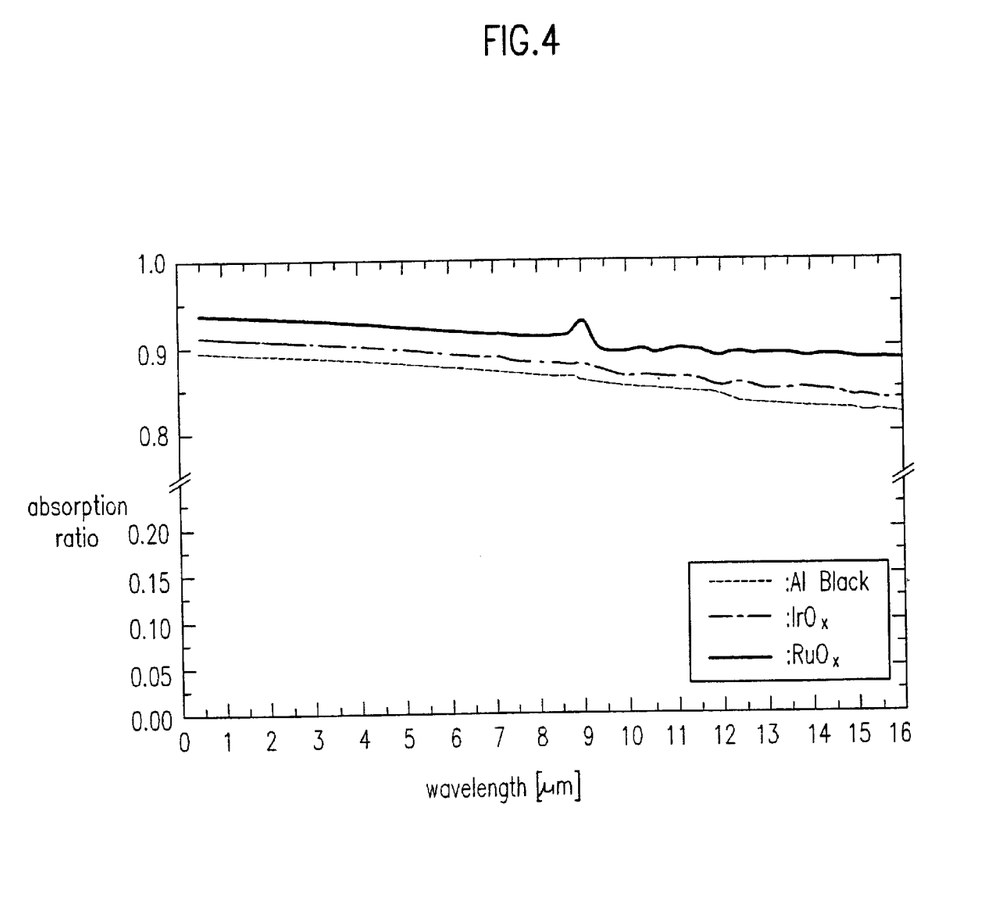
FIG. 4 illustrates a graph showing absorption characteristics of black bodies of the related art and the present invention.

FIG. 4 illustrates a graph showing absorption characteristics of black bodies of the related art and the present invention, wherein all the three infrared ray absorption materials show very good absorption ratios almost up to 90% within a wavelength range of 0.7 to approximately 16 μm.

Figure 5:
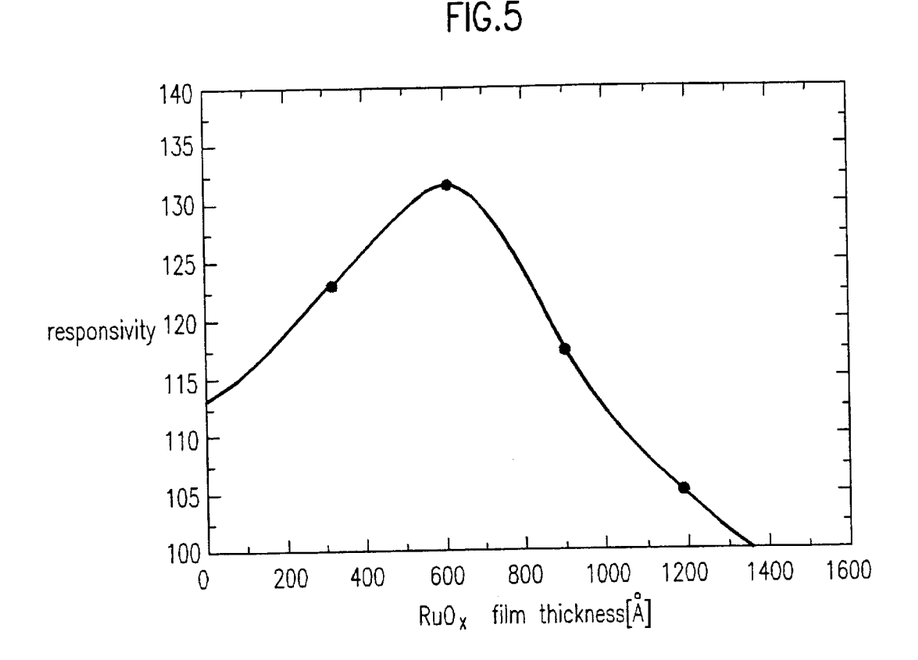
FIG. 5 illustrates a graph showing responsivity of a thermopile detector vs. film thickness of a black body of the present invention; and, FIG. 6 illustrates a graph showing responsivity of a thermopile detector vs. deposition condition of a black body of the present invention.

FIG. 5 illustrates a graph showing responsivity of a thermopile detector vs. film thickness of a black body film of RuOx formed by co-sputtering of Ru and $O_2$ of the present invention, wherein a good responsivity of the thermopile detector is exhibited at a thickness of RuOx ranging from 300 to approximately 800 Å, with a decreasing trend in ranges before and after the above range because a transmittivity of the black body increases when a thickness of a black body film (RuOx film) is below 300 Å and a reflexion ratio increases intrinsic to a thin metal film when a thickness of the black body film (RuOx film) is thicker than 800 Å.

Figure 6:
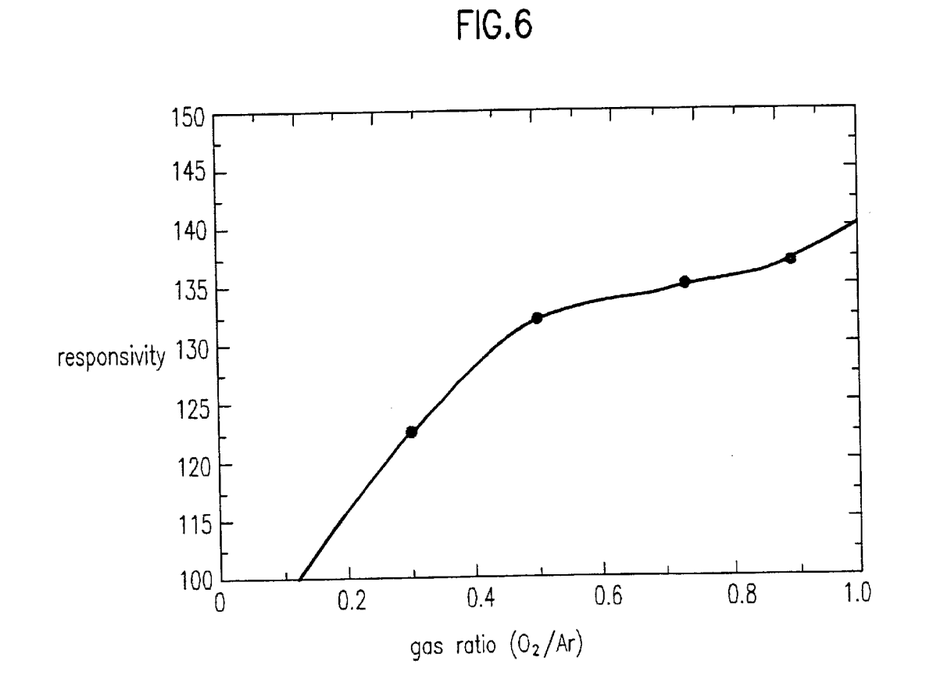

FIG. 6 illustrates a graph showing responsivity of a thermopile detector vs. injected $O_2$ quantity in co-sputtering Ru and $O_2$ to deposit a black body (RuOx) of the present invention, wherein it can be known that, even though the more the injected $O_2$ quantity, the better the responsivity of the thermopile detector, the bonding force of the black body is deteriorated, causing damage to the black body in a following process, when a ratio of the injected $O_2$ quantity is $O_2/Ar>0.7$. Accordingly, $O_2$ should be controlled to be within a range of $O_2/Ar=0.5$ to approximately 0.7 in the co-sputtering of the black body.

The thermopile detector and the method for fabricating the same of the present invention have the following advantages.

The formation of the black body by sputtering and lift-off facilitates a compatibility of fabrication process with an existing semiconductor fabrication process (a CMOS fabrication process), improving a mass production capability, preventing a damage to the diaphragm film occurred in formation of the black body, and controlling a property of the black body uniform. And, the easy formation of the black body with a good bonding force allows to improve yield significantly, dropping a thermopile detector production cost.

It will be apparent to those skilled in the art that various modifications and variations can be made in the thermopile detector and the method for fabricating the same of the present invention without departing from the spirit or scope of the invention. Thus, it is intended that the present invention cover the modifications and variations of this invention provided they come within the scope of the appended claims and their equivalents.

What is claimed is:

1. A thermopile detector comprising:
   a substrate;
   a diaphragm formed on the substrate;
   thermocouples formed on a given region on the diaphragm for sensing a temperature; and
   a black body formed n the thermocouples of one selected from Ru, Ir, RuOx, and IrOx, wherein the black body has a thickness of 300~800 Å.

2. A device, comprising:
   a substrate;
   a first layer formed on the substrate;
   thermocouples formed on the layer; and
   a black body formed on the thermocouples, wherein the black body comprises Ru or an oxide of Ru, wherein the black body is 300~800 Åthick.

3. The device of claim 2, further comprising a second layer between the first layer and the black body.

4. The device of claim 2, wherein the black body comprises an oxide of Ru.

5. A device, comprising:
   a substrate;
   a first layer formed on the substrate;
   thermocouples formed on the layer; and
   a black body formed on the thermocouples, wherein the black body comprises Ir or an oxide of Ir, wherein the black body is 300~800 Åthick.

6. The device of claim 5, further comprising a second layer between the first layer and the black body.

7. The device of claim 5, wherein the black body comprises an oxide of Ir.

8. A device, comprising:
   a substrate;
   a first layer formed on the substrate;
   thermocouples formed on the layer; and
   a black body formed on the thermocouples, wherein the black body comprises an oxide of Ru or Ir, wherein the black body is 300~800 Åthick.

9. The device of claim 8, wherein the oxide is formed by injecting an argon and oxygen mixture with a ratio of $O_2/Ar=0.5$ to approximately 0.7.

10. The device of claim 8, further comprising a second layer between the first layer and the black body.

11. The device of claim 8, wherein the black body comprises an oxide of Ru.

12. The device of claim 8, wherein the black body comprises an oxide of Ir.

13. The device of claim 8, wherein the device comprises a thermopile detector.

* * * * *